Feb. 2, 1926.
E. WILDHABER
HOB
Filed March 13, 1922    2 Sheets-Sheet 1
1,571,359
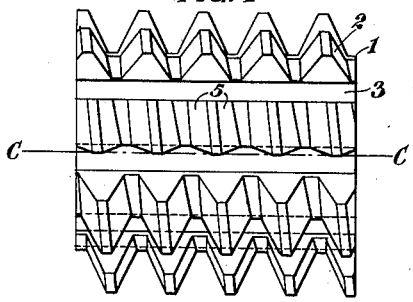
FIG. 1
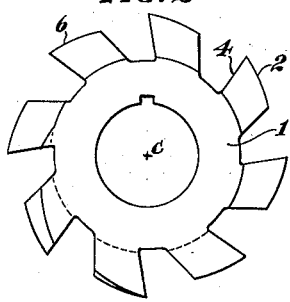
FIG. 2
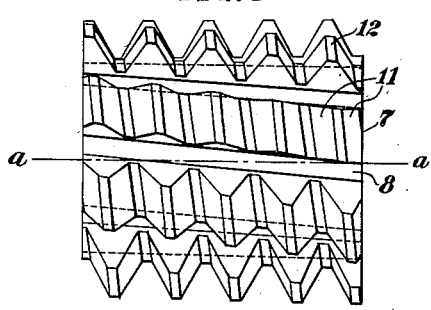
FIG. 3
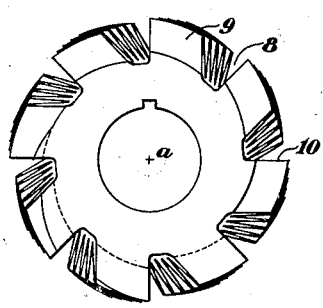
FIG. 4
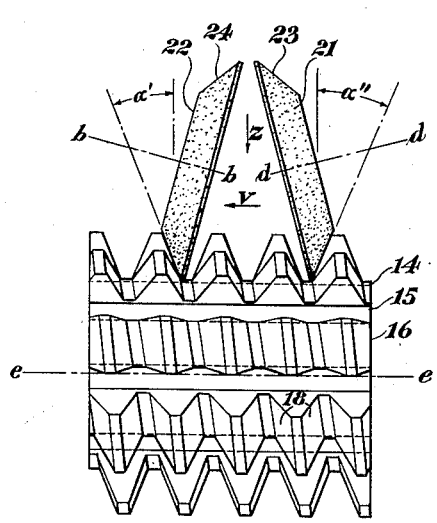
FIG. 5
FIG. 6
INVENTOR
Ernest Wildhaber,
BY Wayne B Well
ATTORNEY Feb. 2, 1926.  1,571,359
E. WILDHABER
HOB
Filed March 13, 1922   2 Sheets-Sheet 2

INVENTOR
Ernest Wildhaber,
BY Wayne B Wells
ATTORNEY

Patented Feb. 2, 1926.

1,571,359

UNITED STATES PATENT OFFICE.

ERNEST WILDHABER, OF BROOKLYN, NEW YORK, ASSIGNOR TO NILES-BEMENT-POND COMPANY, OF NEW YORK, N. Y., A CORPORATION OF NEW JERSEY.

HOB.

Application filed March 13, 1922. Serial No. 543,386.

*To all whom it may concern:*

Be it known that I, ERNEST WILDHABER, a citizen of the Republic of Switzerland, residing at Brooklyn, in the county of Kings and State of New York, have invented certain new and useful Improvements in Hobs, of which the following is a specification.

My invention relates to hobs and particularly to hobs for cutting involute gear teeth.

One object of my invention is to provide a hob with teeth having relieved side surfaces which are ground to true involute helicoids, the lead of each helicoidal surface being different from the lead of the hob thread.

Another object of my invention is to provide a hob that shall comprise teeth arranged in the form of a thread having any desired lead, the front, top and side surfaces of the teeth being ground and the side surfaces of the teeth being in the form of true involute helicoids.

Another object of my invention is to provide a hob that shall comprise teeth formed in a thread by either helical or straight flutes. The cutting faces formed on the teeth by the flutes may be radially or non-radially arranged, as desired, the side surfaces of the teeth being relieved involute helicoids and the top, sides and front faces of the teeth being ground.

A further object of my invention is to provide a hob that shall comprise teeth in the form of a thread having any desired lead, the front cutting faces of the teeth being radially or non-radially arranged, as desired, the side surfaces of the teeth being ground and relieved in the form of true involute helicoids and the lead of the helicoids on the sides of the teeth differing not only from each other, but also from the lead of the hob.

The first conception of a hob for cutting teeth on gear wheels was a worm wherein an axial section is the same as the rack which is used as the basis for the gear system. Each side of such a worm is formed by a tool having a straight cutting edge making a predetermined angle with a plane perpendicular to the blank axis and extending along a line passing through the blank axis. The straight cutting edge is assumed to be revolved and advanced with a uniform lead. The intersection of the surface so formed with a plane perpendicular to the blank axis is an Archimedes spiral and not an involute as in a hob constructed in accordance with my invention. A hob so formed will not cut involute teeth on a gear wheel with the accuracy of a hob which is formed in accordance with my invention and is provided with teeth, the sides of which are true involute helicoids.

When a hob has been formed by a radially arranged cutting edge as above set forth, it is difficult to grind and maintain the surfaces of the sides of the hob teeth. It is well known that it is not possible to accurately grind a continuous screw thread with any degree of accuracy unless the lead of the thread is very small. The reason for the difficulty in grinding the screw thread is the inability of the grinding wheel to cut along the same cutting line by which the thread is formed. If it is difficult to grind a continuous screw thread, it is apparent that a relieved screw thread, which is attempted on the sides of the hob teeth, is even more difficult to grind. Therefore, in grinding screw thread hobs, it is apparent two errors are introduced, the theoretical error of the surface and the error effected in attempting to grind relieved screw threads.

Although a screw thread hob formed in the above indicated manner will cut approximately true involute gear teeth, it is a very difficult matter, as above set forth, to grind the side surfaces of such hob teeth. During the hardening process, the teeth of a hob are more or less distorted. Accordingly, it is necessary to grind the teeth of the hob if gear teeth are to be cut with precision. It is difficult to grind the side screw surfaces of a hob formed in the above indicated manner, inasmuch as there is no tangent plane along the cutting edge which is used to form a screw surface.

In a hob constructed in accordance with my invention, the side surfaces of the teeth are relieved in the form of true involute helicoids. It is an easy matter to grind involute helicoidal surfaces, inasmuch as there is only one plane tangent to the line or cutting edge along which such surface is first formed. Accordingly, it is easy to place a grinding wheel in position to grind an involute helicoidal surface while maintaining its contour unchanged. A hob, constructed in accordance with my invention, may have teeth formed thereon by either straight or helicoidal flutes. Straight flutes are preferred in manufacturing a hob, inasmuch as the hob is generally set at an angle with respect to the work being operated on and accordingly straight flutes effect a more even cutting action by the teeth. The cutting faces on the teeth may be radially or non-radially arranged. However, non-radially arranged or undercut teeth are preferred by reason of the sharper cutting action effected by them. The tops of the hob teeth are preferably ground and are relieved along lines extending backwardly and inwardly from the front cutting edge. The sides of the teeth may be relieved either by the so-called radial relief or the so-called axial relief.

Reference may be had to my copending application Serial No. 543,385, filed March 13, 1922, in which is disclosed methods for forming hobs having teeth provided with involute helicoidal surfaces. Moreover, in such application is disclosed more fully the advantages of an involute helicoidal surface in constructing a hob.

Hobs which are formed in accordance with my invention are particularly adapted to form involute teeth on gear wheels but are not necessarily limited to such operation. Hobs may be formed in accordance with my invention for cutting screw threads, threads on taps, and worm threads and moreover for performing various other similar operations. The forming of true involute helicoids of different leads on the sides of the teeth permit the teeth to be ground with ease and accuracy. Moreover, the forming of true involute helicoids on the sides of the teeth of the hob results in accurate involute teeth being cut by the hob.

In forming a hob from a blank in accordance with my invention, it is preferable to first form a thread which has approximate involute helicoidal sides. The thread may be formed in any suitable manner as by means of a lathe tool or a formed milling cutter. Upon completion of the thread, flutes are cut on the blank through the thread for forming teeth. The flutes may be straight or helical, as desired, and according to the required characteristics of the completed hob. Moreover, the flutes may form either radially arranged or non-radially arranged cutting faces on the teeth. Preferably, non-radially arranged cutting faces are formed on the teeth by straight flutes. It is, of course, apparent if the hob is set square with the work being operated on, the straight flutes will not give as smooth a cutting action as helical flutes. Moreover, if the helix angle of the hob is relatively large, the use of straight flutes will result in a blunt cutting edge on one side of the thread and a relatively sharp cutting edge on the other side of the thread. In such latter case, it is necessary to use helical cutting flutes which will be substantially perpendicular to the helix of the hob in order to maintain suitable cutting edges.

The teeth, formed by the flutes, are relieved in any suitable manner to approximately the finished size. The tops of the teeth must be relieved by the so-called "radial relief" and the sides of the teeth may be relieved by either "radial relief" or the so-called "axial relief". As is pointed out in my companion application, Serial No. 543,385, the same relief may be formed on the sides of the teeth either by a radial or an axial relieving movement. Upon hardening of the hob with the teeth cut a trifle over size, the side surfaces of the teeth are ground to true involute helicoids. The front cutting faces and the tops of the teeth may be ground in any convenient or suitable manner. The wheel, which grinds the sides of the teeth, is preferably a cone-shaped wheel of comparatively large diameter as compared with the wheels now used for grinding hobs. The surface of the wheel, which is used for grinding the sides of the teeth, is set to make a predetermined angle with a plane perpendicular to the blank axis. Moreover, the axis of the grinding wheel is located in a plane which is parallel to, and a vertical distance from, the blank axis. In the above manner, one side of each tooth is ground to an involute helicoid having a lead different from the lead of the hob thread. Upon completion of the involute helicoid upon one side of each tooth, the grinding wheel is set in a different plane parallel to the blank axis and with its grinding surface making a different angle to a plane perpendicular to the blank axis for grinding a true involute helicoid on the opposite side of each blank tooth. The last involute helicoid, so formed, has a lead which differs not only from the lead of the hob thread but also from the lead of the involute helicoid formed on the opposite side of the blank teeth.

Preferably, after hardening the blank, the front cutting faces are ground in accordance with the flutes which are cut through the thread. A narrow ribbon or surface back of the cutting edge on one side of a tooth is then lightly ground to a true involute helicoid with a lead corresponding to the lead of the hob thread. Inasmuch as the teeth on the blank are over size and are relieved, it is apparent only a very small surface of the side of the tooth is engaged by the grinding wheel. An angle is assumed for setting the grinding surface of the wheel to cut an involute relieved surface and from such assumed angle the position of the wheel is figured in the manner set forth in my companion application Serial No. 543,385. The grinding wheel, when set in accordance with the assumed angle, is tried on the side of the blank tooth having a narrow surface back of the front cutting edge ground to a true involute helicoid. If the grinding surface of the wheel grinds a surface on the tooth, which matches the narrow surface ground back of the ground cutting edge, then the angle, which the grinding surface makes with the plane perpendicular to the blank axis, has been correctly assumed. If the wheel grinds a surface, which does not correctly match the surface ground back of the front cutting edge, then the angle must be changed and the position of the grinding axis again determined. In a very few trials the correct position of the grinding wheel can be determined. Each side of the teeth is relieved preferably by moving the grinding wheel toward the blank in a plane parallel to the blank axis. Although the grinding wheel is not moved radially with respect to the blank axis, a relief is provided, which is called "radial relief", in the specification. If so desired, the grinding wheel may be moved axially with respect to the blank and produce exactly the same relief on the blank teeth. Reference may be had to my companion application Serial No. 543,385 above referred to, for a comparison of axial and radial relieving movements in relieving the teeth of a blank.

Upon completion of the true involute helicoid on one side of the blank teeth, a true involute helicoid is ground on the opposite side of the teeth in exactly the same manner. The new setting of the grinding wheel is determined in the manner set forth in my companion application Serial No. 543,385.

In the accompanying drawings:

Figure 1 is a side elevation view of a hob embodying my invention.

Fig. 2 is an end view of the hob shown in Fig. 1.

Fig. 3 is a side elevation view of a hob constructed in accordance with my invention and having helical flutes.

Fig. 4 is an end view of the hob shown in Fig. 3.

Figs. 5 and 6 are diagrammatic views illustrating the positions of cutting wheel for forming involute helicoidal surfaces on the sides of the hob teeth.

Figure 7:
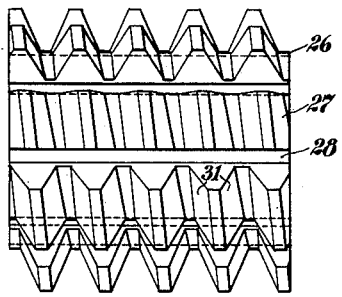
Figs. 7 and 8 are side elevational and end views of a hob having radially arranged cutting faces formed by straight flutes.

Referring to Figs. 1 and 2 of the drawings, a hob 1 is shown provided with teeth 2 which are formed in a continuous thread by means of flutes 3, each of which is located in a plane containing the hob axis. The front cutting faces 4 of the teeth are undercut or non-radially arranged and the side relieved surfaces 5 of the teeth are cut to true involute helicoids. Each side of the hob teeth is shown relieved by the so-called axial relief. The tops of the teeth 6 are also relieved along lines extending backwardly and inwardly from the top cutting edge. The front cutting faces 4, the sides 5 and tops 6 of the teeth are ground. The relief is so formed on the sides and tops of the teeth that the effective contour behind each cutting face is the same at successive surfaces of intersection inclined similarly to the initial cutting face. Thus, in order to sharpen the hob, it is only necessary to grind the front cutting faces.

An involute helicoidal surface may be considered as a surface which is generated by rotating an involute while moving it uniformly in a direction along its axis. It may also be stated that an involute helicoid is formed by screwing an involute along its axis. For a more complete description of the properties of an involute helicoidal surface and the methods of forming such a surface, reference may be had to my copending companion application, Serial No. 543,385 above referred to.

Referring to Figs. 3 and 4, a hob 7 is shown having helical flutes 8 cut through a continuous thread to form teeth 9. The teeth 9 have radially arranged cutting faces 10, as indicated in Fig. 4 of the drawings. The sides 11 of the teeth are cut to true involute helicoids and, as illustrated, are relieved by the so-called radial relief. The tops 12 of the teeth are ground and are relieved by the so-called radial relief. The front cutting faces 10, sides 11 and tops 12 of the teeth are ground in order to accurately cut involute gear teeth. The side surfaces 11 of the teeth are ground to true involute helicoids in the manner disclosed in my companion application, Serial No. 543,385 and as shown in Figs. 5 and 6 of the drawings.

Referring to Figs. 5 and 6 of the drawings, a hob 14 is shown having straight flutes 15 cut through a continuous thread to form teeth 16. The teeth 16 have non-radially arranged cutting faces 17, as indicated in Fig. 6 of the drawings. The side surfaces 18 of the teeth are in the form of true involute helicoids and are ground in the manner to be hereinafter set forth. The tops and also the sides of the teeth 19 are preferably relieved by the so-called radial relief. The front cutting faces 17, the tops 19 and the sides 18 of the teeth are ground in order to accurately cut involute teeth.

In Figs. 5 and 6 of the drawings, two grinding wheels 21 and 22 are shown in position for grinding relieved involute helicoidal surfaces on the teeth 16 of the hob 14. The hob 14 is assumed to rotate on an axis $e-e$ and the grinding wheels 21 and 22 are respectively assumed to rotate on the axes $d-d$ and $b-b$. The grinding wheel 22 is so set that the axis $b-b$ thereof lies in a plane which is located a distance $c'$ from a parallel plane through the axis $e-e$ of the blank. The grinding wheel 21 is so set that the axis $d-d$ thereof is located in a plane which is located a distance $c''$ from a parallel plane through the blank axis. As shown in Figs. 5 and 6, the planes containing the axes of the grinding wheels are in a vertical position but preferably, when grinding relieved involute helicoidal surfaces, the planes containing the axes of the grinding wheels will be in horizontal positions. The grinding surface 23 of the wheel 21 is set to make an angle $\alpha''$ with the plane perpendicular to the axis $e-e$ of the blank. The grinding surface 24 of the grinding wheel 22 is set to make an angle $\alpha'$ with a plane perpendicular to the axis $e-e$ of the blank, as indicated in Fig. 5 of the drawings. The hob 14 is shown as provided with right-handed thread and wheels are assumed to move continuously in the direction indicated by the arrow $v$. The movement of the grinding wheels along the blank is assumed to be effected in timed relation to the blank rotation. Thus, the wheels are moved a distance equal to the lead of the relieved thread for each rotation of the hob blank. In addition to the movements of the grinding wheels in the direction of the arrow $v$, relieving movements are effected in the direction indicated by the arrow $z$. Such relieving movements are in planes parallel to a plane through the blank axis and in a direction toward the blank.

In my companion application Serial No. 543,385 the method of determining the value of the angles $\alpha'$ and $\alpha''$ and also the values of $c'$ and $c''$ is completely disclosed and a further description in this application is deemed unnecessary. Axial relieving movements may also be effected by the grinding wheels without changing the relative position of the wheels with respect to the blank.

Figure 8:
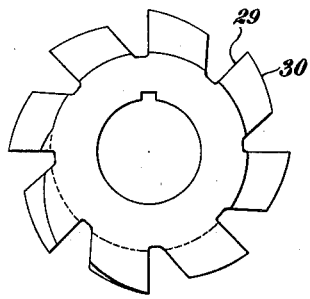

Referring to Figs. 7 and 8 of the drawings, a hob 26 is illustrated having teeth 27 formed by straight flutes 28. The front cutting faces 29 on the teeth, which are formed by the flutes, are shown to be radially arranged. The tops 30 of the teeth are preferably relieved along lines extending backwardly and inwardly from the top front cutting edge by the so-called radial relief. The sides 31 of the teeth are in the form of true involute helicoids and are relieved along lines extending backwardly and to the right or left from the front cutting faces by the so-called axial relief. The tops of the teeth are provided with sufficient radial relief to maintain the width of the teeth on the top substantially constant.

Figure 9:
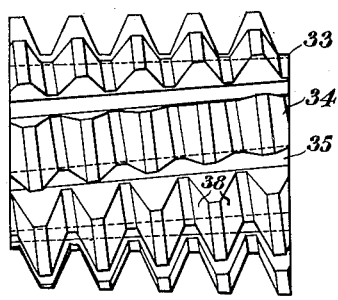
Figs. 9 and 10 are side elevational and end views of a hob having non-radially arranged cutting faces formed by helical flutes.
Figure 10:
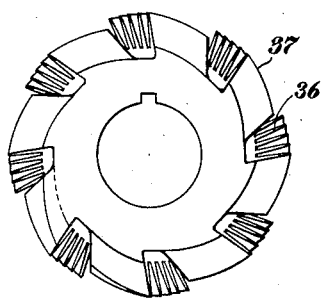

Referring to Figs. 9 and 10 of the drawings, a hob 33 is illustrated having teeth 34 formed in a continuous thread by helical flutes 35. The front cutting faces 36, which are formed on the teeth by the flutes, are non-radially arranged or undercut in order to obtain a sharper cutting action. The tops 37 of the teeth are preferably relieved by the so-called radial relief and along lines extending backwardly and inwardly from the top front cutting edge. The sides 38 of the teeth are in the form of true involute helicoids and are relieved along lines extending backwardly and inwardly from the front cutting face. The front cutting faces 36, the tops 37 and sides 38 of the teeth are ground in any suitable manner and preferably in accordance with the methods disclosed in my companion application Serial No. 543,-385. In Figs. 3, 4, 9 and 10 are disclosed hobs having teeth formed by helical flutes, the teeth in each hob being radially relieved. However, it is to be understood that similar hobs may be provided with teeth which are side relieved. Although the hob illustrated in Figs. 3 and 4 is shown having the flutes inclined in one direction and the hob shown in Figs. 9 and 10 is shown having the flutes inclined in an opposite direction, it is to be understood that the hob shown in Figs. 3 and 4 may have flutes similar to the flutes shown in the hob illustrated in Figs. 9 and 10 and the hob shown in Figs. 9 and 10 may have oppositely inclined flutes if so desired.

Figure 11:
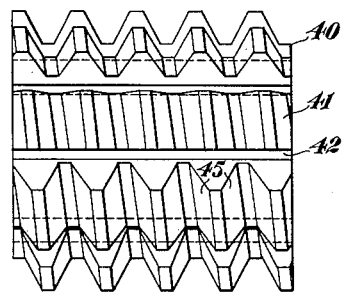
Figs. 11 and 12 are side elevational and end views of a hob having radially relieved teeth provided with radially arranged cutting faces.
Figure 12:
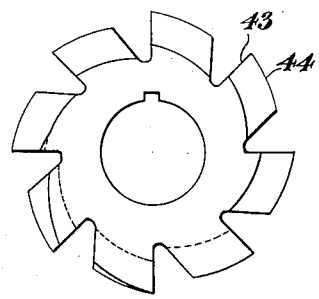

Referring to Figs. 11 and 12 of the drawings, a hob 40 is shown having teeth 41 formed in a continuous thread thereon by means of straight flutes 42. The teeth, which are formed by the flutes, are provided with radially arranged cutting faces 43, as shown in Fig. 12 of the drawings. The tops 44 of the teeth are radially relieved along lines extending backwardly and inwardly from the top front cutting edge. The sides 45 of the teeth are in the form of true involute helicoids and are preferably relieved by the so-called radial relief. The front cutting faces, the tops and the sides of the teeth are ground in order to insure the accurate cutting of involute teeth by them.

A hob having teeth provided with true involute helicoidal side surfaces may be constructed by either straight or spiral flutes. Moreover the cutting faces formed on the teeth by either kind of flutes may be radially or non-radially arranged. Moreover, the helical flutes may be inclined in either direction as desired. The side surfaces of the teeth may be relieved by either the so-called axial relief or the so-called radial relief. The tops of the teeth are preferably relieved by the so-called radial relief. If the sides of the teeth are relieved by the so-called axial or side relief, the tops of the teeth must be provided with sufficient radial relief to maintain the width of the teeth on top substantially uniform. The threads on the hobs may be cut either in a right-hand or a left-hand direction, as desired.

In case a milling cutter having a zero lead were formed in accordance with my invention, one relieved side of each tooth may be considered to have a positive lead and the other side of each tooth may be considered to have a negative lead. In such a cutter it may also be said one side of each tooth conforms to a right-hand spiral and the other side conforms to a left-hand spiral.

It will be understood that such changes and modifications may be made in my invention as fall within the limits of the appended claims.

What I claim is:

1. A hob, comprising teeth arranged in the form of a thread, the sides of the teeth being ground to involute helicoids, the helicoids formed on the sides of the teeth having different leads, and the lead of each helicoid being different from the lead of the hob thread.

2. A hob for milling gear wheels, comprising teeth arranged in the form of a thread and having non-radially arranged cutting faces, the sides of the teeth being ground to involute helicoids and the lead of each of said helicoids being different from the lead of the hob thread, whereby the teeth may be ground on the front cutting faces without changing the effective contour cut thereby.

3. A hob, comprising teeth arranged in the form of a thread, the sides of the teeth being ground to helicoids and the sides and the tops of the teeth being radially relieved so that the effective contour behind each cutting face is the same at successive surfaces of intersection inclined similarly to the initial cutting face, whereby the teeth may be ground on the front cutting faces without changing the effective contour cut thereby.

4. A hob for milling gear wheels, comprising teeth arranged in the form of a thread, the sides of the teeth being ground to involute helicoids, and the sides and the tops of the teeth being relieved so that the effective contour behind each cutting face is the same at successive surfaces of intersection inclined similarly to the initial cutting face, whereby the teeth may be ground on the front cutting faces without changing the effective contour cut thereby.

5. A hob, comprising teeth having non-radially arranged cutting faces, the sides of the teeth being ground to helicoids and the sides and the tops of the teeth being radially relieved so that the effective contour behind each cutting face is the same at successive surfaces of intersection inclined similarly to the initial cutting face, whereby the teeth may be ground on the front cutting faces without changing the effective contour cut thereby.

6. A hob for milling gear wheels, comprising teeth having non-radially arranged cutting faces, the sides of the teeth being ground to involute helicoids, and the sides and the tops of the teeth being relieved so that the effective contour behind each cutting face is the same at successive surfaces of intersection inclined similarly to the initial cutting face, whereby the teeth may be ground on the front cutting faces without changing the effective contour cut thereby.

7. A hob, comprising a thread having flutes cut therethrough to form undercut teeth, the tops, the sides and the front cutting faces of the teeth being ground, the sides of the teeth being ground to helicoids, the lead of each of said helicoids being different from the lead of the hob thread and the sides and the tops of the teeth being relieved along lines extending backwardly and inwardly from the front cutting edges.

8. A hob, comprising a thread having flutes cut therethrough to form teeth, the tops, the sides and the front faces of the teeth being ground, the sides of the teeth being ground to involute helicoids, the lead of each of said helicoids being different from the lead of the hob thread, and the sides and the tops of the teeth being relieved along lines extending backwardly and inwardly from the front cutting edges.

9. A hob for milling gear wheels, comprising a thread having flutes cut therethrough to form teeth, the teeth having non-radially arranged cutting faces, the front faces and the tops and sides of the teeth being ground, the sides of the teeth being ground to involute helicoids, and the sides and the tops of the teeth being relieved along lines extending backwardly and inwardly from the front cutting edges so that the effective contour behind each cutting face is the same at successive surfaces of intersection inclined similarly to the initial cutting faces.

10. A hob for milling gear wheels, comprising teeth having non-radially arranged cutting faces formed by flutes each of which is located in a plane including the hob axis, the sides of the teeth being ground to involute helicoids, and the sides and the tops of the teeth being relieved back of the front cutting edges so that the effective contour behind each cutting face is the same at successive surfaces of intersection inclined similarly to the initial cutting face, whereby the teeth may be ground on the front cutting faces without changing the effective contour cut thereby.

11. A hob, comprising teeth arranged in the form of a thread having their front cutting faces formed by straight flutes, the sides and the tops of the teeth being radially relieved back of the front cutting edges, the sides of the teeth being ground to helicoids and the lead of each said helicoid being different from the lead of the hob thread, whereby the teeth may be ground on the front cutting faces without changing the effective contour cut thereby.

12. A hob, comprising teeth arranged in the form of a thread and having their front cutting faces formed by flutes each of which is located in a plane including the hob axis, the sides and the tops of the teeth being relieved back of the front cutting edges, the sides of the teeth being ground to involute helicoids, and the lead of each of said helicoids being different from the lead of the hob thread, whereby the teeth may be ground on the front cutting faces without changing the effective contour cut thereby.

13. A milling cutter, comprising rows of teeth formed by flutes, the teeth being relieved back of the cutting faces formed by the flutes, the sides of the teeth being ground to involute helicoids and the helicoids formed on the sides of teeth having different leads, whereby the teeth may be ground on the front cutting faces without changing the effective contour cut thereby.

14. A milling cutter, comprising rows of teeth having front cutting faces formed by flutes each of which is located in a plane containing the hob axis, the sides of the teeth being ground to involute helicoids and the teeth being relieved along lines extending backwardly and inwardly from the front cutting edges so that the effective contour behind each cutting face is the same at successive surfaces of intersection inclined similarly to the initial cutting face, whereby the teeth may be ground on the front cutting faces without changing the effective contour cut thereby.

15. A milling cutter, comprising rows of teeth having non-radially arranged cutting faces formed by flutes each of which is located in a plane containing the hob axis, the teeth being relieved along lines extending backwardly and inwardly from the front cutting edges, the sides of the teeth being ground to involute helicoids, and the helicoids formed on the sides of the teeth having different leads, whereby the teeth may be ground on the front cutting faces without changing the effective contour cut thereby.

In testimony whereof, I hereto affix my signature.

ERNEST WILDHABER.